(12) United States Patent
Boess

(10) Patent No.: US 6,195,900 B1
(45) Date of Patent: Mar. 6, 2001

(54) SYSTEM FOR MEASURING A MOTOR VEHICLE WHEEL POSITION

(75) Inventor: Walther Boess, Bobstadt (DE)

(73) Assignee: Hofman Werkstatt-Technik GmbH, Pfungstadt (DE)

( * ) Notice: Subject to any disclaimer, the term of this patent is extended or adjusted under 35 U.S.C. 154(b) by 0 days.

(21) Appl. No.: 09/116,586

(22) Filed: Jul. 16, 1998

(30) Foreign Application Priority Data

Jul. 16, 1997 (DE) .................................. 197 30 524

(51) Int. Cl.[7] ........................................ G01B 5/24
(52) U.S. Cl. ................... 33/203.13; 33/203.14; 33/203.12
(58) Field of Search ...................... 33/203, 203.12, 33/203.13, 203.14, 203.21, 600

(56) References Cited

U.S. PATENT DOCUMENTS

| | | | |
|---|---|---|---|
| 3,685,161 | * 8/1972 | MacPherson | 33/203.13 |
| 4,631,832 | * 12/1986 | Schrammen et al. | 33/203.14 |
| 5,090,235 | * 2/1992 | Hirano et al. | 33/203.13 |
| 5,150,515 | * 9/1992 | Merrill et al. | 33/203.12 |
| 5,207,001 | * 5/1993 | Rossato | 33/203.12 |
| 5,257,458 | * 11/1993 | Koerner | 33/203.12 |
| 5,287,626 | * 2/1994 | Reich | 33/203.14 |
| 5,513,438 | * 5/1996 | Emmons | 33/203.12 |
| 5,569,836 | * 10/1996 | Hill | 33/203.14 |
| 5,870,315 | * 2/1999 | January | 33/203 |
| 6,018,878 | * 2/2000 | Fukuda et al. | 33/203.12 |

* cited by examiner

*Primary Examiner*—Christopher W. Fulton
*Assistant Examiner*—Quyen Doan
(74) *Attorney, Agent, or Firm*—Pillsbury Madison & Sutro LLP

(57) ABSTRACT

A vehicle wheel position measurement device is provided. The device includes a frame adapted for mounting on a base body. Mounted on the frame, is a pair of rollers configured for supporting a wheel of the vehicle during a measurement procedure. Also included are roller bodies for enabling the frame to roll along the base body. Finally, a motion limiting device is included for limiting a range of movement of the frame on the base.

18 Claims, 1 Drawing Sheet

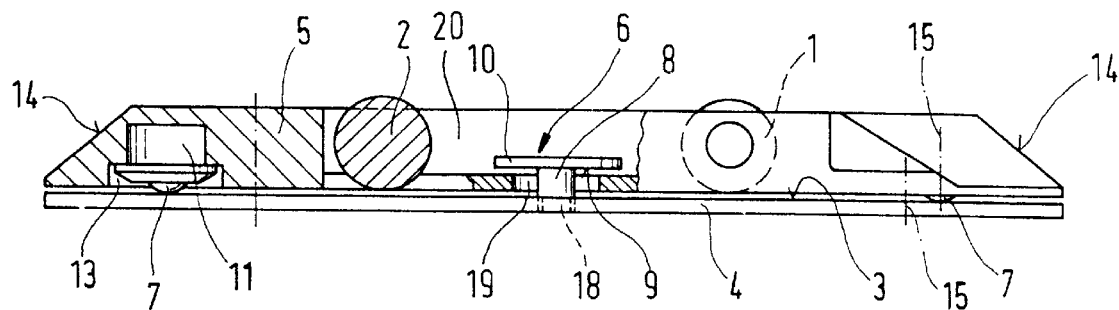
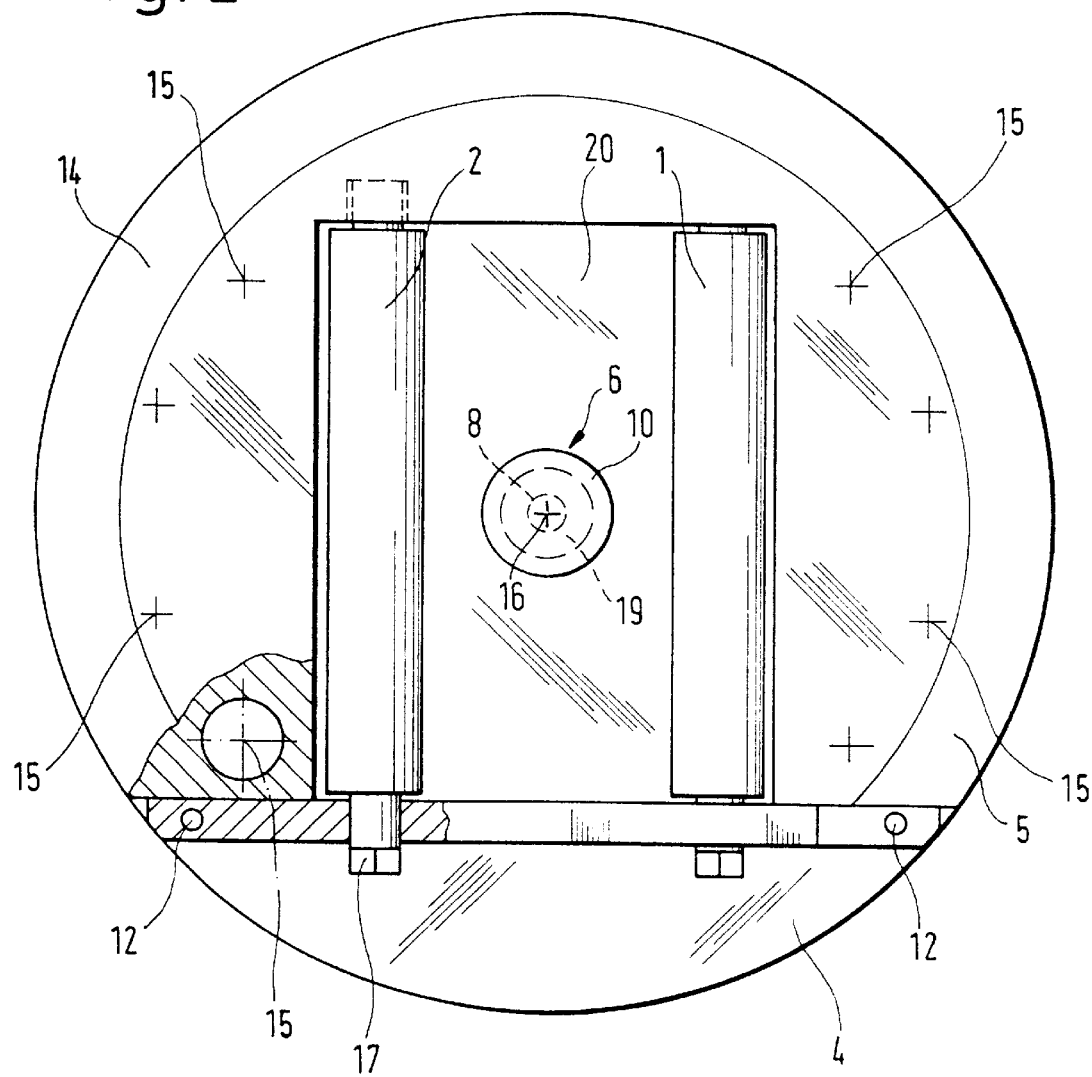

SYSTEM FOR MEASURING A MOTOR VEHICLE WHEEL POSITION

BACKGROUND OF THE INVENTION

1. Field of the Invention

The present invention relates to a system for measuring a wheel position on a vehicle. In particular, it relates to the mounting of two rollers, in parallel, and rotating in a frame and onto which a motor vehicle wheel can be placed in a measuring stand,

2. Description of Related Art

A system from EP 0 199 913 has two rollers which are mounted parallel and rotating in a frame and onto which a motor vehicle wheel can be placed in a measuring arrangement, in particular for measuring its wheel position. Furthermore, a support device, having a roller body, for a floating mounting and/or movement of the frame in a horizontal place on a base body is provided. In connection therewith the roller bodies are arranged in fixed positions on the frame. The frame is supported via the roller bodies on a level horizontal base surface that is provided on the base body. Furthermore, this system has a motion-limiting device in the form of a slit, molded into the base body designed as a plate, and into which a swivel pin attached.

A system is also known from EP 0 376 037 A 1, in which the roller bodies may be designed as rolling balls and the frame may be supported on the base body by cylinder-actuated feet for surmounting the roller body mounting. Furthermore, this system has a lever connected with the frame, with which the frame, and the rollers mounted on it, can be removed from the base body for transport.

What is needed is a system of with simplified handling, which will, therefore, ensure flexibility of use.

SUMMARY OF THE INVENTION

It is a primary object of the present invention to provide a system of coherent construction which can be used, portably in different measuring arrangement—in particular measuring stands—as a unit consisting of the frame, the rollers mounted herein, and the base body.

Another object of the present invention is to provide a system in which the two rollers are mounted rotating, and preferably designed as a rigid plate. The roller bodies are preferably designed as rolling balls that may be arranged in a ball cage attached to the frame, preferably on a circle. The center of the circle coincides with the center of the frame. In the initial condition, in which the frame can be stopped on the base body, this center is situated over the middle of the horizontal base surface on the base body. The ball rollers may also be arranged in separate mountings on the periphery of the circle. The ball rollers are preferably situated in embeddings on the bottom of the plate-shaped frame.

Furthermore, attached to the base body is a motion-limiting device which has one or more stop surfaces against which the frame can be rested to limit its horizontal motion. The motion-limiting device is preferably situated in the middle of the horizontal base surface and protrudes with a stop pin into a central opening on the frame. The motion-limiting device may also have a holding-down plate that has one or more stop surfaces by means of which a movement of the frame directed perpendicular to the horizontal base surface is limited.

DESCRIPTION OF THE DRAWINGS

The invention is explained in greater detail in a form of construction with the help of the following figures. They show:

FIG. 1 is a sectional illustration of a form of construction; and

FIG. 2 is a the form of construction in a top view in partially cutoff illustration

DESCRIPTION OF THE PREFERRED

In the illustrated form of construction, two rollers 1 and 2 are mounted in parallel arrangement rotating in a plate-shaped frame 5 designed as a rotary table. The frame 5 is supported via ball rollers 7, e.g. of plastic or steel, on a horizontal base surface 3 on a base body 4. The base body 4 is also designed as a flat plate.

In this way, a floating mounting of the frame 5 on the base body 4 in a horizontal plane is achieved. A motor vehicle wheel, in particular a front wheel of a motor vehicle, can be placed on and/or rolled onto the rollers 1 and 2 to conduct measurements, in particular measurements of the wheel position on the motor vehicle. For this purpose, diagonal surfaces 14 can also be provided on both sides of the frame 5; they serve as on-ramps to more easily ride the wheel onto the rollers 1 and 2. With the help of stops 12, e.g. pins protruding from the frame 5 into the base plate 4, the frame 5 can be stopped when placing/rolling a wheel onto the rollers 1 and 2 on the base plate 4. When releasing the stops, the frame 5 is supported floating in the horizontal plane on the base plate 4, thereby relieving in the horizontal plane the wheel place onto the rollers 1 and 2.

The ball rollers 7, that form the roller bodies via which the frame 5 is supported floating on the level, horizontal base surface 3, may be arranged in embeddings 13 on the bottom of the frame 5. For this purpose, the ball rollers 7 are situated in mountings that are placed into corresponding recesses/embeddings 13 on the bottom of the plate-shaped frame 5. Such ball rollers can be arranged at several points 15 on a circle around the middle 16 of the base surface 3 in a ball cage or in separate mountings.

The overall height of the system may be dimensioned extremely low, at approx. 45 mm, for example. The system diameter may be dimensioned at approx. 450 mm. This results in a flexible use of the system, able to be designed portable, in different measuring arrangements.

For connecting a rotary drive, one of the two rollers, for example the roller 2, may have a connecting piece 17, hexagonal for example.

A motion-limiting device 6 is attached to the base plate 4, for example by a screw connection 18. The motion-limiting device 6 has a stop surface, in the form of a stop pin 8, that extends perpendicular to the horizontal base surface 3 through a central opening 19 of the frame 5. The stop pin 8 diameter is smaller than the diameter of the opening 19. A holding-down plate 10 is attached at the upper end of the stop pin 8, with a horizontal stop surface 9 on its bottom. By means of this motion-limiting device 6, a floating movement of the frame 5 in relation to the base plate 4 is allowed within a limited range. This range is dimensioned such that a relieving of the motor vehicle wheel placed onto the rollers 1 and 2 for the wheel positions occurring in actual practice is achieved during the measuring procedure. The motion-limiting device 6 is situated in an embedding 20 between the two rollers 1 and 2 in the middle of the frame 5. The embedding 20 as well as the height of the motion-limiting device 6 are dimensioned in such a way that respective types of motor vehicle wheel can be placed unhindered onto the rollers 1 and 2. An unintended detaching of the frame 5 from the base plate 4 is prevented by the holding-down plate 10.

As can be seen in particular from FIG. 1, to achieve low height of the overall arrangement the form of construction makes use of the fact that the rollers 1 and 2 have a specific diameter, 40 mm for example, for their use as the contact surfaces for the wheel to be measured. On condition of this overall height, the ball rollers 7 are arranged, in top view, at fixed positions 15 of the frame 5, preferably in embeddings 13 situated next to the rollers 1 and 2. For this purpose, the ball rollers 7 may be arranged in a ball cage or in separate ball mountings 11. The ball rollers 7 have a diameter of approx. 22 mm and protrude only slightly, roughly 2–5 mm for example, in particular 3 mm, beyond the bottom of the frame 5, in such a way that the desired floating mounting on the base surface 3 in obtained. The distance between the bottom of the plate-shaped base body 4 and the top of the plate-shaped frame 5 is approx. 45 mm. The distance of the axes of the two rollers 1 and 2 from each other may be approx. 150 mm.

Due to the motor vehicle wheel's mounting on the rollers 1 and 2 that is practically force-free in the horizontal plane with respect to the ground, measurements requiring a rotation of the raised wheel, e.g. measurement of a rim deviation, can be carried out without needing to lift the motor vehicle wheel as was typical previously.

Measuring of the wheel position with regard to track, camber and the like can also be conducted on the wheel placed on the rollers 1 and 2, with the help of conventional measuring systems.

What is claimed is:

1. An apparatus for measurement of a vehicle wheel position, comprising:

a frame having a horizontal axis;

a pair of rollers rotatably mounted within the frame in the vicinity of a top side of the frame, the rollers being (i) mounted substantially parallel to one another in alignment with the axis, and (ii) arranged for supporting the wheel;

roller bodies rotatably mounted at a fixed position within the frame, the roller bodies being configured for rolling;

a base body for supporting the frame, the base body having a horizontal base surface configured for frictionally engaging the roller bodies;

wherein the roller bodies provide rolling movement of the frame when the base surface frictionally engages the roller bodies, the rolling movement being in a direction substantially parallel to the base surface; and a motion limiting device attached to the base body, the motion limiting device including at least one stop surface configured for limiting the rolling movement, the step surface protruding through a central opening of the frame and arranged perpendicularly to the horizontal base surface in order to limit the rolling movement.

2. An apparatus according to claim 1, wherein the frame rolling movement is configured for stopping on the base body.

3. An apparatus according to claim 1, wherein the roller bodies are rolling balls made of plastic or steel.

4. An apparatus according to one of claims 2–3, wherein the frame, with the pair of rollers, the roller bodies, and the base body, form a transportable unit.

5. An apparatus according to one of claims 2–3, wherein the roller bodies are circularly arranged on the frame.

6. An apparatus according to one of claim 2–3, wherein the roller bodies are embedded in the frame in the vicinity of the pair of rollers and in the vicinity of a bottom side of the frame.

7. An apparatus according to claim 1, wherein the motion limiting device is arranged in a middle area of the base surface.

8. An apparatus according to claim 7, wherein the motion limiting device includes a holding-down plate, the holding-down plate including at least one other stop surface.

9. An apparatus according to one of claims 2–3, or 7–8, wherein ramps are provided at a periphery of the frame along diametrical points.

10. An apparatus according to one of claims 1–3, or 7–8, wherein rim deviation can be measured on the wheel when the wheel rotates.

11. An apparatus according to claim 1, wherein the frame, with the pair of rollers, the roller bodies, and the base body, form a transportable unit.

12. An apparatus according to claim 1, wherein the roller bodies are circularly arranged on the frame.

13. An apparatus according to claim 1, wherein the roller bodies are embedded in the frame in the vicinity of the pair of rollers and in the vicinity of a bottom side of the frame.

14. An apparatus according to claim 1, wherein ramps are provided at a periphery of the frame along diametrical points.

15. An apparatus according claim 11, wherein the roller bodies are circularly arranged on the frame.

16. An apparatus according claim 11, wherein the roller bodies are embedded in the frame in the vicinity of the pair of rollers and in the vicinity of a bottom side of the frame.

17. An apparatus according to one of claims 11–13, wherein ramps are provided at a periphery of the frame along diametrical points.

18. An apparatus according to one of claims 11–14, wherein rim deviation can be measured on the wheel when the wheel rotates.

* * * * *